United States Patent Office 3,591,619
Patented July 6, 1971

3,591,619
PREPARATION OF NITROTETRACYANOCYCLO-
PENTADIENIDE SALTS BY REACTION OF TET-
RACYANODITHIIN, TETRACYANOTHIOPHENE
OR DICHLOROFUMARONITRILE WITH NITRO-
METHANE
Owen W. Webster, Wilmington, Del., assignor to E. I. du
Pont de Nemours and Company, Wilmington, Del.
No Drawing. Filed Nov. 21, 1968, Ser. No. 777,887
Int. Cl. C07c *121/48*
U.S. Cl. 260—464                    6 Claims

ABSTRACT OF THE DISCLOSURE

Described and claimed are the processes for preparing nitrotetracyanocyclopentadienide salts which comprise
(1) the base-catalyzed reaction of nitromethane with tetracyanodithiin according to the equation

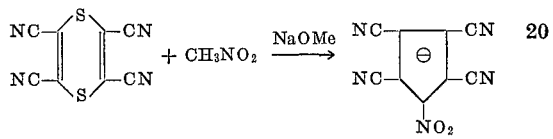

(2) the base-catalyzed reaction of nitromethane with tetracyanothiophene followed by nitration of the resulting mercaptotetracyanocyclopentadienide according to the equation

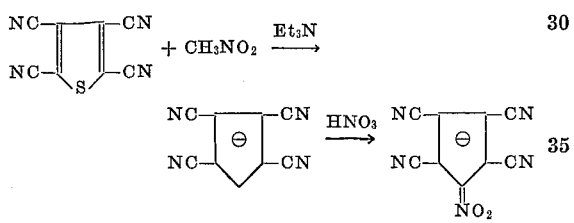

(3) the base-catalyzed reaction of nitromethane with dichlorofumaronitrile according to the equation

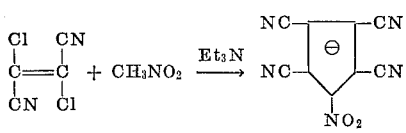

Nitrotetracyanocyclopentadienide salts are useful in the preparation of the diazotetracyanocyclopentadiene dyes.

BACKGROUND OF THE INVENTION (1) Field of the invention

This invention relates to three methods for preparing nitrotetracyanocyclopentadienide salts comprising (1) the base-catalyzed reaction of nitromethane with tetracyanodithiin; (2) the base-catalyzed reaction of nitromethane with tetracyanothiophene followed by nitration of the resulting mercaptotetracyanocyclopentadienide; and (3) the base-catalyzed reaction of nitromethane with dichlorofumaronitrile.

(2) Description of the prior art

So far as is known the methods of this invention for the preparation of nitrotetracyanocyclopentadienide salts are new and have not been disclosed heretofore in the chemical or patent literature. The nitrotetracyanocyclopentadienide salts have, however, been prepared by a process distinct from those of the present invention which is reported by Webster in J. Am. Chem. Soc., 88, 4055 (1966).

SUMMARY AND DETAILS OF THE INVENTION

This invention relates to the processes for preparing nitrotetracyanocyclopentadienide salts which comprise
(1) the base-catalyzed reaction of nitromethane with tetracyanodithiin according to the equation

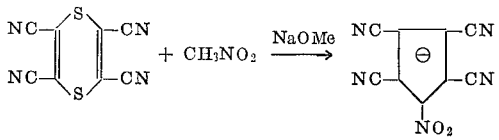

(2) the base catalyzed reaction of nitromethane with tetracyanothiophene followed by nitration of the resulting mercaptotetracyanocyclopentadienide according to the equation

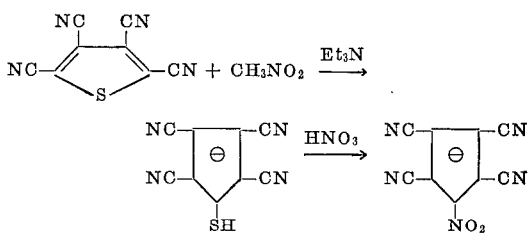

(3) the base catalyzed reaction of nitromethane with dichlorofumaronitrile according to the equation

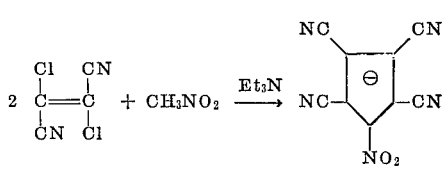

In the practice of process (3) of this invention the preferred molar ratio of dichlorofumaronitrile to nitromethane is 2:1. In the practice of processes (1) and (2) the preferred molar ratios of tetracyanodithiin to nitromethane and tetracyanothiophene to nitromethane are 1:1. However molar ratios of these various reactants in the range of 10:1 to 1:20 can be used; in fact, nitromethane can be used as the reaction solvent.

The operable temperature limits are −80 to +200° C. with temperatures in the range of 20 to 80° C. being preferred. Pressures of up to 3000 atmospheres can be employed, but for reasons of convenience work at atmospheric pressure seems preferable.

The reactions which comprise the present invention may be conducted in any liquid medium in which the reactants are soluble, but polar aprotic solvents such as methylene chloride, dimethylacetamide, dimethylformamide, acetonitrile and nitromethane are preferred.

Any base capable of reacting with nitromethane to generate the nitromethanide ion can be used to catalyze the preparative reactions of this invention. Since the pKa of nitromethane is 10, any base with a pKb of under 6 will generate enough nitromethanide ion to cause the reaction to proceed. For optimum operation of the foregoing preparative processes, however, the base employed should have a pKb of 4 or less. Preferred bases are trimethylamine, triethylamine, sodium methoxide and sodium ethoxide. Other operable bases are $(CH_3)_2NH$, $CH_3NH_2$, $NH_3$, $NaCH_2NO_2$, $KCH_2NO_2$, $CH_3CH_2NH_2$ $(CH_3CH_2)_2NH$, NaOH, KOH, NaH, $CH_3MgBr$ $CH_3CH_2MgBr$, $Al(isoBu)_3$, $Hal(isoBu)_2$, $K_2CO_3$, $Na_2CO_3$, CaO and $Ca(OH)_2$. The preferred amount of base employed is 3 moles per mole of nitromethane; however, amounts as low as 1 mole or as high as 10 moles can be used.

Further details relating to each of the preparative procedures of this invention are disclosed in the following nonlimiting examples.

EMBODIMENTS OF THE INVENTION

In the following examples all temperatures are expressed in ° C. and all pressures are expressed in atmospheres unless otherwise indicated.

EXAMPLE I

Nitrotetracyanocyclopentadienide from tetracyanodithiin and nitromethane (A) A mixture of 2.4 g. of sodium hydride, 5.38 ml. of nitromethane, 35 ml. of dimethylacetamide and 100 ml. of 1,2-dimethoxyethane was heated under reflux for 1 hour. The mixture was cooled to 0° C., and 21.6 g. of tetracyanodithiin was added portionwise over 2 hours. The mixture was then heated under reflux for 18 hours. 1,2-dimethoxyethane was distilled from the reaction mixture until its temperature reached 160°. The reaction mixture was held at 160° for 5 hours, cooled, and diluted with an aqueous solution of tetra methylammonium chloride. Tetramethylammonium nitrotetracyanocyclopentadienide, 5.9 g., precipitated. It was identified by its infrared spectrum: $\bar{\nu}_{max}$ 2200, 1520, 1320, 880, 755, and 735 cm.$^{-1}$ [O. W. Webster, J. Am. Chem. Soc., 88, 4055 (1966)].

(B) To a mixture of 2.16 g of tetracyanodithiin, 0.54 ml. of nitromethane and 50 ml. of acetonitrile there was added 4.2 ml. of triethylamine in one portion. The temperature rose to 40° in about 5 minutes and then dropped. After 30 minutes the solution was diluted with 100 ml. of water, and 1.66 g. of tetraethylammonium chloride was added. Tetraethylammonium nitrotetracyanocyclopentadienide (1.09 g.) precipitated. Its identity was confirmed by its infrared spectrum and by reduction of a small amount with zinc and hydrochloric acid to aminotetracyanocyclopentadienide.

(C) The procedure used in Example B was repeated except that dimethylformamide was the solvent. 0.53 g. of nitrotetracyanocyclopentadienide was produced.

(D) The procedure used in Example B was repeated except that benzene was used as the solvent. 0.65 g. of nitrotetracyanocyclopentadienide was produced.

(E) The procedure used in Example B was repeated except that 1,2-dimethoxyethane was used as solvent. 0.67 g. of nitrotetracyanocyclopentadienide was produced.

(F) The procedure used in Example B was repeated except that ethanol was used as the solvent. 0.17 g. of nitrotetracyanocyclopentadienide was produced.

(G) To a solution of 108 g. of tetracyanodithiin and 27 ml. of nitromethane in 2 liters of methylene chloride there was added 210 ml. of triethylamine in one portion. The solution was stirred for 3 hours, and the solvent and other volatile materials were distilled. The residue was dissolved in 550 ml. of concentrated nitric acid. After 1 hour the nitric acid solution was poured into 2 liters of ice water containing 83 g. of tetraethylammonium chloride. Tetraethylammonium nitrotetracyanocyclopentadienide (79.5 g.) precipitated.

(H) To a suspension of 16.2 g. of sodium methoxide in 100 ml. of tetrahydrofuran there was added 16.5 ml. of nitromethane. The mixture was stirred for 2 hours and then 21.6 g. of tetracyanodithiin was added in one portion. The temperature rose to 48°. The reaction mixture was stirred overnight, and 100 ml. of water was added containing 16 g. of tetraethylammonium chloride. The solution was concentrated to 100 ml. and was then diluted with 1 liter of water. 14 g. of tetraethylammonium nitrotetracyanocyclopentadienide precipitated.

EXAMPLE II

Nitrotetracyanocyclopentadienide from tetracyanothiophene and nitromethane (A) SYNTHESIS OF MERCAPTOTETRACYANO-CYCLOPENTODIENIDE (1) A mixture of 2.4 g. of sodium hydride, 5.38 ml. nitromethane, 100 ml. of 1,2-dimethoxyethane and 35 ml. dimethylacetamide was cooled to 0° C. and 18.4 g. of tetracyanothiophene was added over 1 hour. The mixture was then heated under reflux for 18 hours. 1,2-dimethoxyethane was distilled from the mixture and heating was continued for 4 hours at 160°. The mixture was cooled, diluted with water and treated with tetraethylammonium chloride until no more precipitate formed. Tetraethylammonium mercaptotetracyanocyclopentadienide (21.0 g.) was collected on a filter. The product was purified by chromatography on alumina and by recrystallization from dichloroethane. Its identity was confirmed by comparison of its UV and IR spectra and its M.P. of 288–288.5° with those of tetraethylammonium mercaptotetracyanocyclopentadienide prepared by a different route [O. W. Webster, J. Am. Chem. Soc., 88, 4055 (1966)].

Analysis.—Calcd. for $C_{17}H_2N_5S$ (percent): C, 62.3; H, 6.4; N, 21.4. Found (percent): C, 62.1; H, 6.3; N, 21.7.

(2) A solution of 18.4 g. tetracyanothiophene, 5.38 ml. nitromethane and 150 ml. acetonitrile was heated under reflux, and 14.0 ml. triethylamine in 50 ml. of acetonitrile was added dropwise over 4 hours. The mixture was cooled and 16.5 g. of tetraethylammonium chloride was added. The mixture was then diluted with 1 liter of water. Tetraethylammonium mercaptotetracyanocyclopentadienide (24.0 g.) precipitated.

(B) CONVERSION OF MERCAPTOTETRACYANOCYCLOPENTADIENIDE TO NITROTETRACYANOCYCLOPENTADIENIDE

A solution of 24.0 g. of tetraethylammonium mercaptotetracyanocyclopentadienide in 1.5 lbs. of concentrated nitric acid was allowed to stand at room temperature for 1 hour and was then diluted with 1.5 liters of water containing 10 g. of tetraethylammonium chloride. Tetraethylammonium nitrotetracyanocyclopentadienide (13.4 g.) precipitated. It was identified by its infrared spectrum.

EXAMPLE III

Nitrotetracyanocyclopentadienide from dichlorofumaronitrile and nitromethane (A) To a solution of 2.94 g. of dichlorofumaronitrile and 0.54 ml. of nitromethane in 60 ml. of acetonitrile at −30° C. there was added 5.6 ml of triethylamine. The solution was allowed to warm up and was stirred at room temperature for 1 hour. It was then heated under reflux for 16 hours. The solvent was distilled, and the residue was dissolved in 25 ml. of concentrated nitric acid. The nitric acid solution was diluted with 100 ml. of water containing 2.0 g. of tetraethylammonium chloride. Tetraethylammonium nitrotetracyanocyclopentadienide (0.84 g.) precipitated.

(B) To a solution of 2.94 g. of dichlorofumaronitrile and 0.54 ml. of nitromethane in 50.0 ml. of dimethylacetamide at −20° C. there was added 5.6 ml. of triethylamine. The solution was stirred at room temperature for ½ hour and was then refluxed for 3 hours. The reaction mixture was concentrated to dryness under reduced pressure, and the residue was dissolved in 30 ml. of concentrated nitric acid. After ½ hour the nitric acid solution was poured into 300 ml. of water containing 1.65 g. of tetraethylammonium chloride. The precipitate which formed was dried and was twice extracted with 250 ml. portions of warm methylene chloride. The extract was concentrated to dryness, and the residue was washed with ethyl acetate. There remained 0.89 g. of tetraethylammonium nitrotetracyanocyclopentadienide.

Nitrotetracyanocyclopentadienide salts are useful in the preparation of the diazotetracyanocyclopentadiene dyes which are claimed in applicant's copending application Ser. No. 678,536, filed Oct. 27, 1967, issued as U.S. Pat. 3,536,694 on Oct. 27, 1970.

For example, tetraethylammonium 1-nitro-2,3,4,5-tetracyanocyclopentadienide is reduced with zinc and hydrochloric acid to tetraethylammonium 1-amino-2,3,4,5-tetracyanocyclopentadienide as shown in Example XXVII of U.S. Patent 3,536,694. This amino compound is treated with sodium nitrite and hydrochloric acid to obtain diazotetracyanocyclopentadiene as shown in Example IX of the aforementioned case. The diazo compound is coupled with substituted phenols, anilines, naphthols and naphthylamines to give a whole spectrum of dyes for polyamide textiles as shown in Examples XXXIV and XXXV and in Tables I and II of U.S. Pat. 3,536,694.

The embodiments of the invention in which an exclusive property or privilege is claimed are defined as follows:

1. The process for the preparation of nitrotetracyanocyclopentadienide salts which comprises reacting nitromethane with tetracyanodithiin, in the presence of a base catalyst, at a temperature in the range $-80°$ to $+200°$ C. and at a pressure between 0 and 3,000 atmospheres.

2. The process of claim 1 wherein the reaction temperature is in the range 20 to 80° C., the reaction pressure is one atmosphere and the molar ratio of tetracyanodithiin to nitromethane is 1:1.

3. The process for the preparation of nitrotetracyanocyclopentadienide salts which comprises reacting nitromethane with tetracyanothiophene, in the presence of a base catalyst, at a temperature in the range of $-80$ to $+200°$ C., at a pressure between 0 and 3,000 atmospheres and nitrating the resulting mercaptotetracyanocyclopentadienide with nitric acid.

4. The process of claim 3 wherein the reaction temperature is in the range 20 to 80° C., the reaction pressure is one atmosphere and the molar ratio of tetracyanothiophene to nitromethane is 1:1.

5. The process for the preparation of nitrotetracyanocyclopentadienide salts which comprises reacting nitromethane with dichlorofumaronitrile, in the presence of a base catalyst, at a temperature in the range of $-80$ to $+200°$ C. and at a pressure between 0 and 3,000 atmospheres.

6. The process of claim 5 wherein the reaction temperature is in the range 20 to 80° C., the reaction pressure is one atmosphere and the molar ratio of dichlorofumaronitrile to nitromethane is 2:1.

References Cited

UNITED STATES PATENTS

| 3,226,423 | 12/1965 | Vest | 260—464 |
| 3,379,751 | 4/1968 | Webster | 260—464 |

OTHER REFERENCES

Webster: J.A.C.S., vol. 88 (9-5-66), pp. 4055-4060.

JOSEPH P. BRUST, Primary Examiner

U.S. Cl. X.R.

260—448, 688

PO-1050
(5/69)

UNITED STATES PATENT OFFICE
CERTIFICATE OF CORRECTION

Patent No. 3,591,619          Dated July 6, 1971

Inventor(s) Owen W. Webster

It is certified that error appears in the above-identified patent and that said Letters Patent are hereby corrected as shown below:

Col. 1, line 37 - "-SH" should be attached at bottom of first formula; double bond between ring and $NO_2$ should be single.

Col. 1, line 44 - "2" should be inserted at beginning of line.

Col. 2, line 71 - "al" should be "Al".

Col. 3, line 27 - close space after "tetra".

Signed and sealed this 25th day of January 1972.

(SEAL)
Attest:

EDWARD M. FLETCHER, JR.
Attesting Officer

ROBERT GOTTSCHALK
Commissioner of Patents